United States Patent
Aquino et al.

(10) Patent No.: US 7,073,423 B2
(45) Date of Patent: Jul. 11, 2006

(54) COMPLIANCE DEVICE FOR TRIMMING A WORKPIECE

(75) Inventors: Reggie V. Aquino, Oxford, MI (US); Douglas R. Nowak, Romulus, MI (US); Kim A. Wawrzyniak, Oxford, MI (US)

(73) Assignee: Robotic Production Technology, Inc., Auburn Hills, MI (US)

( * ) Notice: Subject to any disclaimer, the term of this patent is extended or adjusted under 35 U.S.C. 154(b) by 137 days.

(21) Appl. No.: 10/664,578

(22) Filed: Sep. 17, 2003

(65) Prior Publication Data

US 2005/0056134 A1    Mar. 17, 2005

(51) Int. Cl.
   *B26D 5/08*  (2006.01)
   *B22D 31/00* (2006.01)

(52) U.S. Cl. ............................ 83/582; 29/33 A; 83/914

(58) Field of Classification Search ................ 83/914, 83/582, 584, 585, 699.31; 29/33 A; 30/229, 30/330; 267/277, 237, 137, 140.5
   See application file for complete search history.

(56) References Cited

U.S. PATENT DOCUMENTS

| | | | |
|---|---|---|---|
| 2,289,912 A | | 7/1942 | Hirsch |
| 2,929,300 A | | 3/1960 | Zwick |
| 4,312,255 A | * | 1/1982 | Holmstrom ............... 83/582 |
| 4,696,524 A | | 9/1987 | Cloyd |
| 4,770,575 A | | 9/1988 | Kolblin et al. |
| 4,944,080 A | | 7/1990 | Blumbach et al. |
| 4,976,412 A | * | 12/1990 | Simon et al. ............ 248/634 |
| 5,027,682 A | | 7/1991 | Aiso et al. |
| 5,163,008 A | * | 11/1992 | Gerber et al. ........... 700/240 |
| 5,165,829 A | | 11/1992 | Ross et al. |
| 5,211,501 A | | 5/1993 | Nakamura et al. |
| 5,312,212 A | | 5/1994 | Naumec |
| 5,655,426 A | | 8/1997 | DeJohn |
| 5,845,554 A | * | 12/1998 | Kozyrski ................. 83/455 |
| 5,868,529 A | | 2/1999 | Rothballer et al. |
| 5,931,071 A | * | 8/1999 | Mori ......................... 83/74 |
| 5,951,214 A | | 9/1999 | Rothballer et al. |
| 6,079,912 A | | 6/2000 | Rothballer |
| 6,086,294 A | | 7/2000 | Danchine et al. |
| 6,154,941 A | * | 12/2000 | Cadena et al. ........... 29/90.01 |
| 6,227,082 B1 | | 5/2001 | Hormansdorfer et al. |
| 6,309,152 B1 | | 10/2001 | Prosl |
| 6,368,012 B1 | | 4/2002 | St. Onge et al. |
| 6,375,378 B1 | | 4/2002 | Kitaura |

(Continued)

FOREIGN PATENT DOCUMENTS

DE    39 32 089 A1    5/1990

(Continued)

OTHER PUBLICATIONS

Brochure: THK LM System—Economical Circular Guide R Guide Type HCR, THK Co., Ltd. Tokyo, Japan, Catalog No. 154-2E, Mar. 1998 (8 pages).

(Continued)

*Primary Examiner*—Kenneth E. Peterson
*Assistant Examiner*—Isaac N. Hamilton
(74) *Attorney, Agent, or Firm*—Dickinson Wright PLLC

(57) ABSTRACT

A compliance device having a housing, a support block coupled to the housing and movable relative to the housing along a linear axis, and a tool holder coupled to the support block and rotatable relative to the support block about a rotational axis. The compliance device is further incorporated into a trimming assembly for trimming flash from a workpiece. The trimming assembly includes a positioning mechanism and the compliance device is coupled to the positioning mechanism.

17 Claims, 4 Drawing Sheets

U.S. PATENT DOCUMENTS 6,398,279 B1 6/2002 Kikut

FOREIGN PATENT DOCUMENTS

| DE | 90 16 465.2 | 4/1991 |
|----|-------------|--------|
| DE | 44 10 762 A1 | 10/1995 |
| DE | 297 10 727 U1 | 11/1997 |
| EP | 0 845 440 A1 | 6/1998 |
| EP | 0 894 563 A2 | 2/1999 |
| EP | 0 925 163 B1 | 12/2000 |
| FR | 2 510 029 | 7/1981 |
| GB | 2 213 750 A | 8/1989 |
| JP | 61-56840 | 3/1986 |
| JP | 62-259709 | 11/1987 |
| SU | 780986 | 11/1980 |
| WO | WO 97/11807 | 4/1997 |
| WO | WO 00/37205 | 6/2000 |

OTHER PUBLICATIONS

Web Site: Linear Slides 3500 Series, Parker Automation, Catalog 8080/USA, Aug. 2002 (11 pages).

Brochure: Compliance Wrist, Robohand, Inc. (13 pages).

* cited by examiner

COMPLIANCE DEVICE FOR TRIMMING A WORKPIECE

BACKGROUND OF THE INVENTION

Plastic parts are commonly manufactured for a variety of industries through blow-molding, injection molding, and other operations. These parts, as well as parts formed of other materials, commonly need to be trimmed or deflashed in order to remove excess material and provide a proper finish. Traditionally, the trimming or deflashing of these parts was performed manually. A variety of automated trimming and deflashing processes and devices are also available for improved throughput, reduced labor costs, and increased reliability and finish quality. Many of these devices include compliance tools that are coupled to a controllable positioning arm, compensate for part-to-part variation, and can be used with a wide variety of cutters for contoured or straight edge trimming and other operations. However, available compliance devices still suffer from a variety of drawbacks including undue complexity that make many of these devices expensive to manufacture and difficult to service. While these complex designs may be appropriate for certain applications, a simple and less expensive design is generally appropriate for other applications such as the trimming of workpieces having linear and/or relatively large radius curves. Accordingly, a need exists for a compliance tool for the robotic flash removal and trimming of parts, including blow-molded and injection molded plastic parts.

SUMMARY OF THE INVENTION

In view of the above, the present invention is directed to a compliance device having a housing, a support block coupled to the housing and movable relative to the housing along a linear axis, and a tool holder coupled to the support block and rotatable relative to the support block about a rotational axis. The compliance device is further incorporated into a trimming assembly for trimming flash from a workpiece. The trimming assembly includes a positioning mechanism and the compliance device is coupled to the positioning mechanism.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

As is illustrated in the attached drawings, the present invention is directed to a compliance device 10 that is adapted to be coupled to a robotic arm or other controllable positioning mechanism for trimming or deflashing workpieces. The device has a variety of applications including the trimming and deflashing of blow-molded parts (such as automotive fuel tanks, lawn and garden equipment, and toys) or injection molded parts (such as containers, automotive fascia and films, body panels, and interior and exterior trim components). The device is suitable for use with a variety of materials including high-end low density polyethylene, polyurethane, thin polycarbonate films, nylon, polyester vinyl and foam, and polypropylene.

Figure 1:
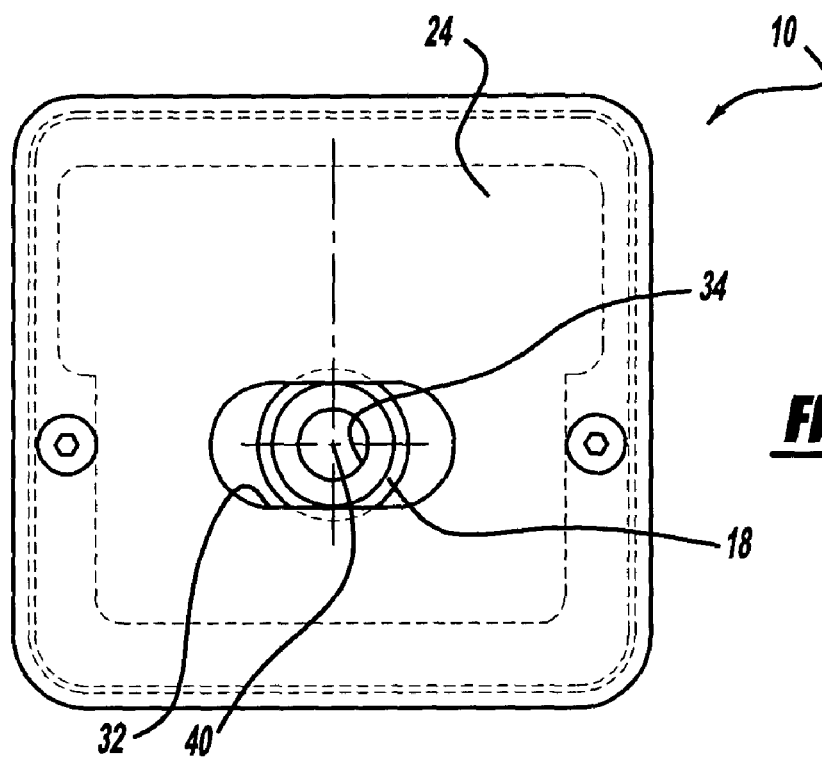
FIG. 1 is a top plan view of the compliance device of the present invention.
Figure 2:
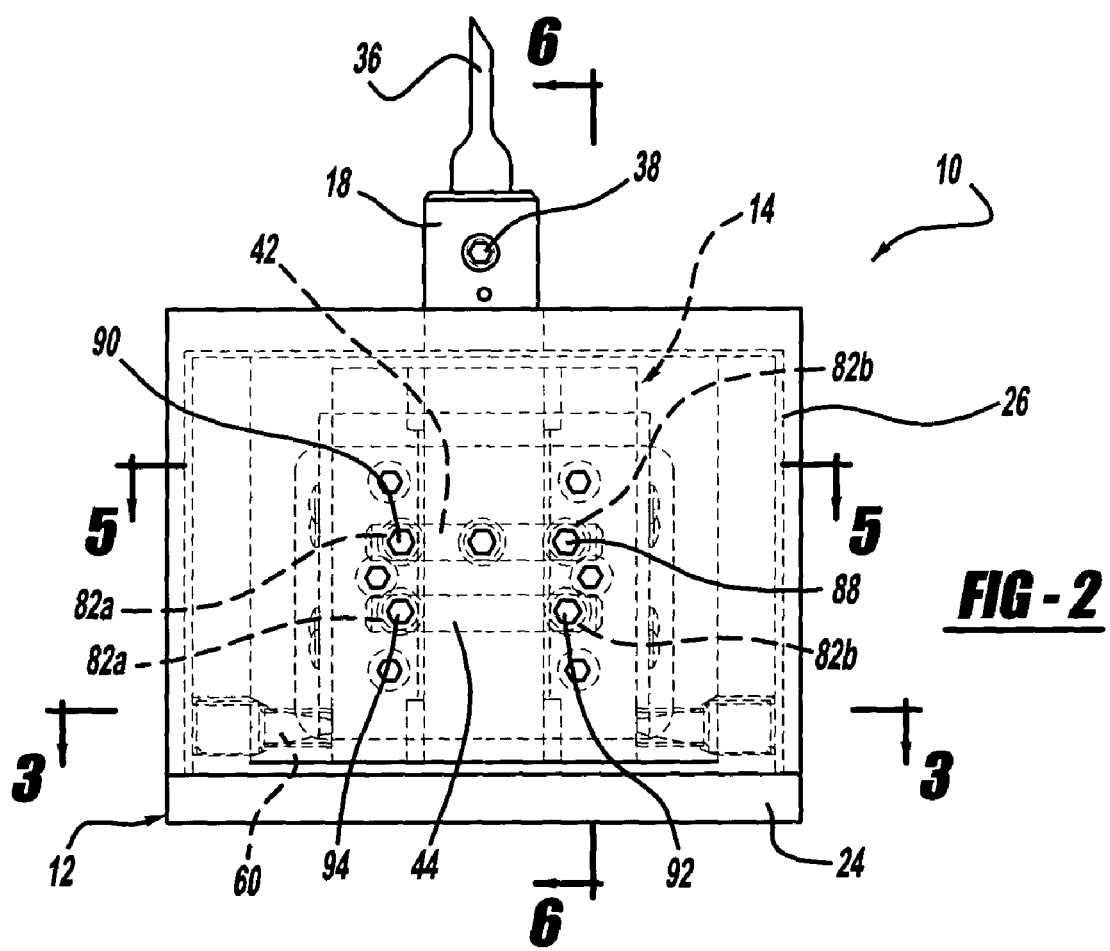
FIG. 2 is a front elevation view of the compliance device.
Figure 3:
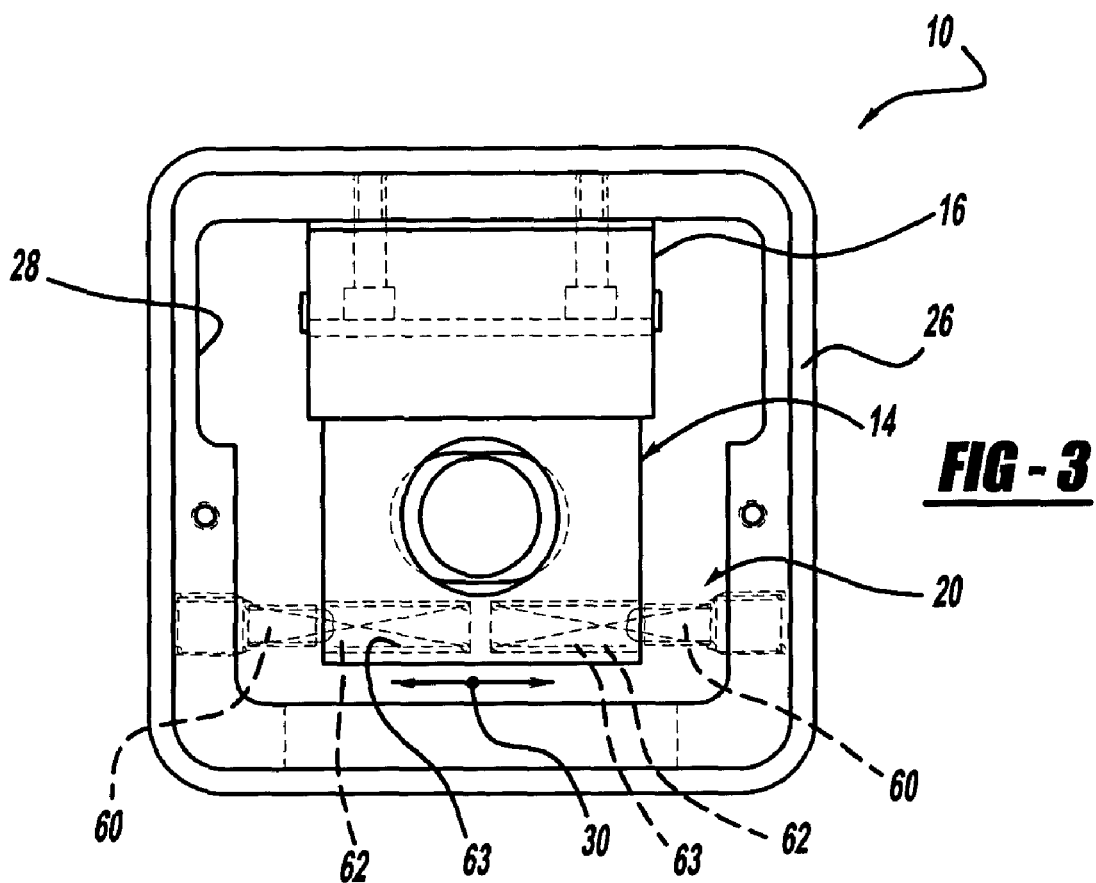
FIG. 3 is a sectional view of the compliance device taken along the line 3—3 shown in FIG. 2.
Figure 4:
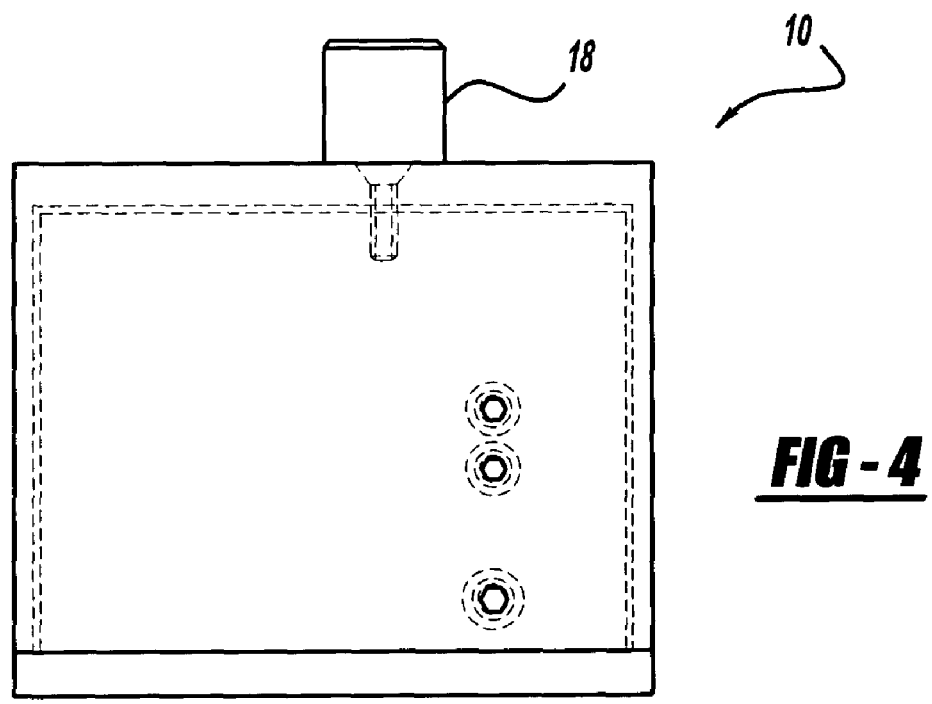
FIG. 4 is a side elevation view of the compliance device.
Figure 5:
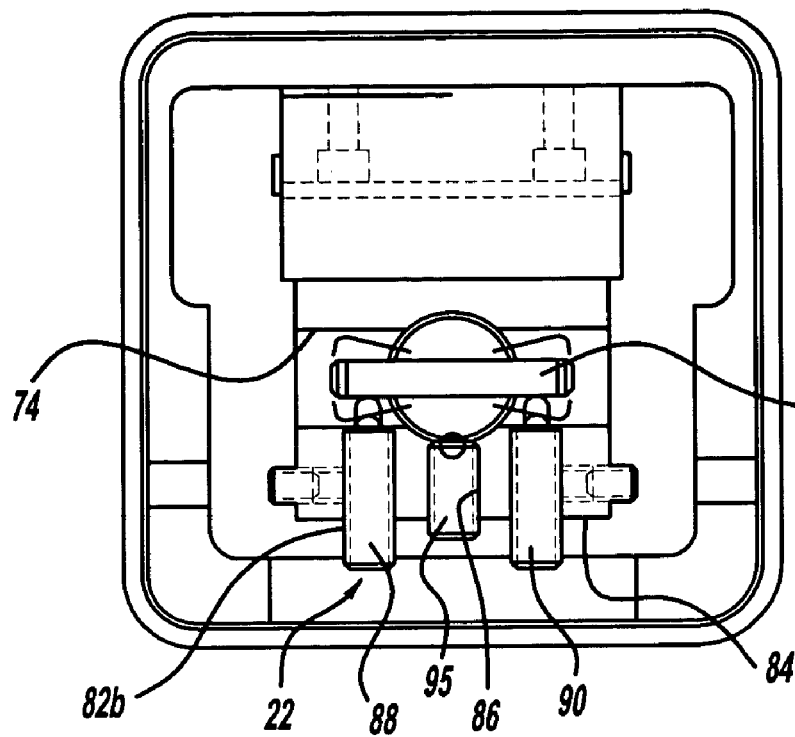
FIG. 5 is a sectional view of the compliance device taken along the line 5—5 shown in FIG. 2.

The device 10 includes a housing 12, a support block 14, a slide coupler 16 (FIG. 3), a tool holder shaft 18, and first and second biasing assemblies 20 (FIG. 3) and 22 (FIG. 5). The housing 12 preferably includes a cover 24 and a body 26 cooperating to define a cavity 28 (FIG. 3). The cover includes an elongated linear slot 32 (FIG. 1) within which the shaft 18 is disposed for linear movement. The support block 14 is disposed within the cavity 28 and linearly movable (arrow 30 in FIG. 3) relative to the housing via the slide coupler 16. The tool holder shaft 18 includes an open ended axial bore 34 (FIG. 1) adapted to receive a tool, such as a knife 36 (FIG. 2). A retainer 38, such as the illustrated set screw or other conventional mechanism, is operable to removably secure the tool to the shaft and permit tool changing as needed. The tool holder shaft 18 is disposed in the elongated linear slot 32, is rotatable relative to the support block 14 about an axis 40, and moves with the support block 14. A pair of dowels 42 and 44 (FIGS. 2 and 5) are fixed to rotate with the tool holder 18 and are operatively engaged by the second biasing assembly 22 to urge the tool holder toward a centered position but permit rotation as needed to maintain proper alignment of the tool with the workpiece.

By providing limited rotation of the shaft 18 relative to the block 14 as well as linear movement of the support block within the housing 12, the device of the present invention simplifies the arrangement of components thereby providing a light weight compliance tool having reduced manufacturing and assembly costs, improved ease of maintenance and service while also enabling the use of commonly available linear slides. Moreover, the linear only movement of the block maintains knife contact with the parting line of the workpiece through a completely mechanical and simple unit capable of providing a one pass Class A finish in most applications. While the compliance device of the present invention has numerous applications, it is particularly suited for trimming along linear and/or relatively large radius (e.g., greater than about one inch) surfaces and, due in part to its small size, to trimming in tight spaces.

The slide coupler 16 includes a first member 50 (FIG. 6) fixed to the housing, such as by fasteners 52, and a second member 54 fixed to the support block 14. The first and second members are mechanically coupled to one another through a conventional linear slide, such as the illustrated cross roller bearing assembly, to permit bi-directional linear movement of the block 14 and shaft 18 relative to the housing as shown by arrow 30 in FIG. 3. A variety of conventional slide mechanisms of the type illustrated and described herein are available in the art and suitable for use with the present invention. For example, a CR4001 cross bearing distributed by Parker Automation, Daedel Division of Irwin Pennsylvania may be used. As a further illustration of the many types of suitable slide couplers, a ball bearing assembly disposed in cooperating semi-cylindrical recesses in the first and second members 50 and 52, as in the CR4001 ball bearing Square Profile Slide distributed by Parker Automation, may also be used. Notwithstanding these exemplary illustrations of suitable slide mechanisms, those skilled in the art will appreciate that a variety of alternative mechanisms may be used without departing from the scope of the invention defined by the appended claims.

The first biasing assembly 20 is illustrated in FIG. 3 to include coil springs 62 disposed about pins 60 fixed to the housing 12. The block is provided with a pair of blind guide bores 63 extending inward from its sides so as to receive the pins and springs to guide and bias movement of the support block. With the springs operatively engaging the closed ends of the bores, the opposed biasing force of the springs continuously urge the support block 14 toward its centered position. A detent post 64 (FIG. 6) is also coupled to the housing and positioned to engage a detent recess 66 formed in the support block 14 to seat the support block in a centered position relative to the elongated linear slot 32 and housing.

Figure 6:
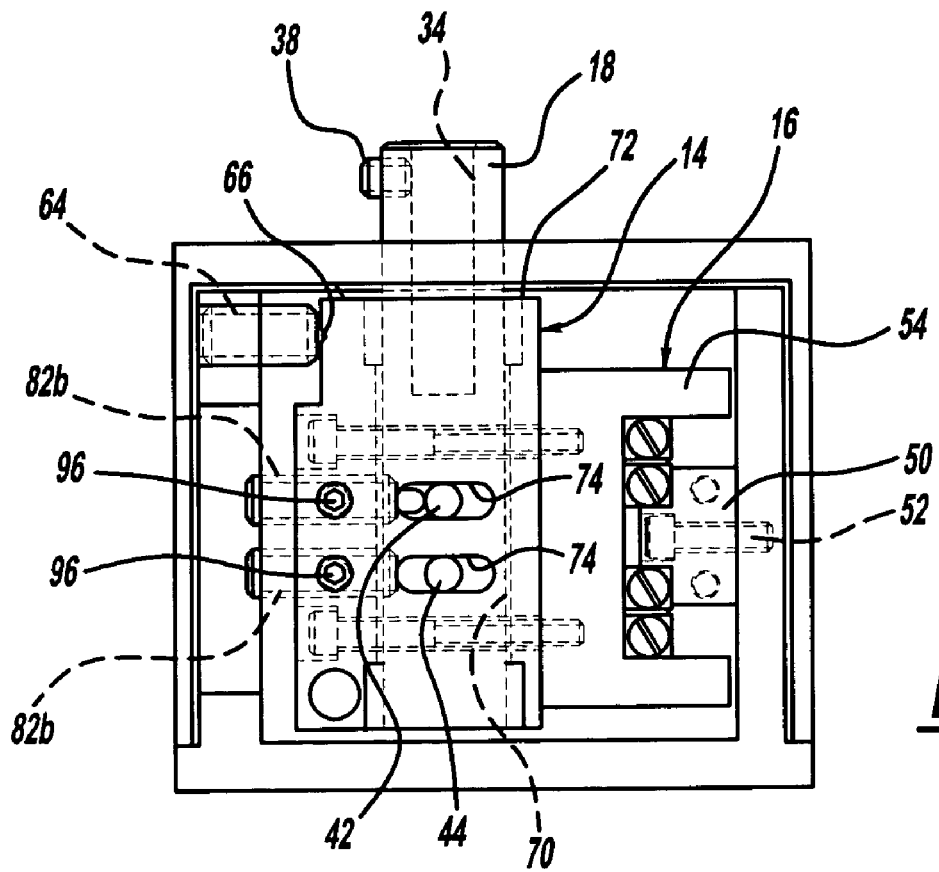
FIG. 6 is a sectional view of the compliance device taken along the line 6—6 shown in FIG. 2.

As to the second biasing assembly 22, the block is shown in FIGS. 2, 5, and 6 to include: a cavity 70 (FIG. 6) extending from an end face 72; a pair of elongated slots 74 extending inward from each side of the block to communicate with the cavity 70; a plurality of passages arranged in pairs 82a and 82b extending from a front 84 (FIG. 5) of the block to the cavity 70 and aligned with the dowels 42 and 44; and a bore 86 also extending from the block front 84 to the cavity 70. The shaft 18 is disposed in the cavity 70 for rotation and the pair of axially spaced dowels 42 and 44 are fixed to rotate with the shaft and disposed in the elongated slots 74. Biasing elements, such as the illustrated spring plungers 88 and 90 (FIG. 5), and set screws 92 and 94 are disposed in the paired passages 82a and 82b such that one of the plungers and one of the set screws operatively engage a dowel segment on each side of the shaft 18. By this arrangement, the plungers bias the shaft toward its centered position and the set screws are adjustable to limit the shaft's angle of rotation. A ball plunger 95 is disposed in the bore 86 (FIG. 5) to seat the shaft in its centered position. Additional set screws 96 are provided to secure the position of plungers and set screws.

Figure 7:
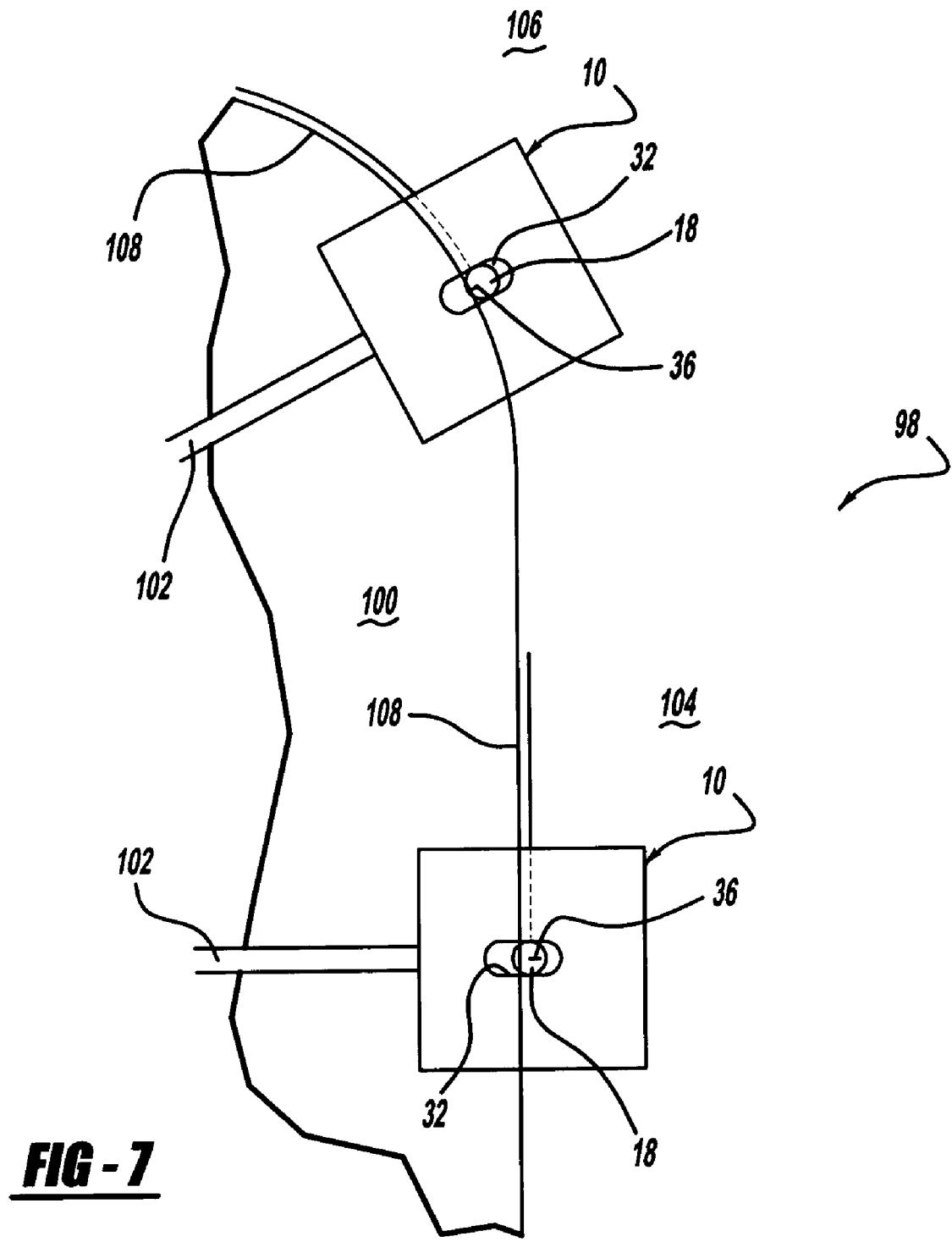
FIG. 7 is a top plan view showing two positions of the compliance device when trimming a representative workpiece and coupled to a schematically illustrated positioning mechanism.

The operation of the compliance device will now be described with reference to the trimming of a workpiece 100 shown in FIG. 7. In the illustrated trimming assembly 98, the compliance device 10 is fixed to a controllable positioning mechanism 102, such as, for example, a six-axis robot arm. The device is shown in a first position 104 and a second position 106 relative to the workpiece. During trimming, the positioning mechanism is controlled to continuously position the compliance device 10 such that the knife 36 and the axis of the elongated slot 32 are oriented perpendicular to the surface of the workpiece being trimmed. By this arrangement, the knife 36 follows a workpiece parting line 108 and floats linearly and perpendicularly relative to the parting line. Rotation of the tool holder shaft 18 relative to the support block 14 and housing 12 also provides a degree of flexibility to enhance the performance of the tool.

In view of the above, it should be appreciated that the linear movement of the tool holder shaft and support block relative to the housing provides a simple, low cost, and flexible compliance tool for trimming or deflashing workpieces. Moreover, the structural details of the device described above further enhance the benefits of the invention.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A compliance device for trimming comprising:
   a housing;
   a support block coupled to said housing and movable relative to said housing along a linear axis; and
   a tool holder coupled to said support block and rotatable relative to said support block about a rotational axis, said tool holder capable of holding a cutting tool;
   a first biasing assembly urging said tool holder toward a linearly centered position; and
   a second biasing assembly urging said tool holder to a rotationally centered position.

2. The compliance device of claim 1 wherein said rotational axis is substantially perpendicular to said linear axis.

3. The compliance device of claim 1 further including a linear slide coupling said support block to said housing, said linear slide having a first member fixed to said housing and a second member fixed to said support block, said second member being linearly movable relative to said first member.

4. The compliance device of claim 3 wherein said first biasing assembly is coupled to said housing, and operably engages said support block and said housing, said first biasing assembly urging said support block toward a linearly centered position.

5. The compliance device of claim 4 wherein said second biasing assembly is coupled to said housing and operably engages said tool holder to urge said tool holder toward a rotationally centered position.

6. The compliance device of claim 5 wherein said second biasing assembly further includes adjustable stops to limit rotation of said tool holder about said rotational axis.

7. The compliance device of claim 6 wherein second biasing assembly further includes first and second dowels fixed to rotate with said tool holder and biasing elements operably engaging said first dowel to urge said tool holder toward the rotationally centered position, and wherein said adjustable stops engage said second dowel to limit rotation of said tool holder about said rotational axis.

8. The compliance device of claim 7 wherein said biasing elements are spring plungers.

9. The compliance device of claim 8 wherein said adjustable stops are set screws.

10. The compliance device of claim 1 wherein said second biasing assembly limits the rotation of said tool holder about said rotational axis.

11. The compliance device of claim 1 wherein said housing includes a cover having an elongated linear slot and wherein said tool holder is disposed within said linear slot for movement along said linear axis.

12. The compliance device of claim 1 wherein said second biasing assembly includes set screws to adjust the limit of the tool holder's angle of rotation about said rotational axis.

13. A trimming assembly for trimming flash from a workpiece, comprising:
   a positioning mechanism;
   a compliance device coupled to said positioning mechanism, said compliance device including a housing, a support block coupled to said housing and movable relative to said housing along a linear axis;

a first biasing assembly urging said support block toward a linearly centered position;

a tool holder coupled to said support block and rotatable relative to said support block about a rotational axis; and a second biasing assembly urging said tool holder to a rotationally centered position.

14. The trimming assembly of claim 13 wherein said rotational axis is substantially perpendicular to said linear axis.

15. The trimming assembly of claim 13 further including a linear slide coupling said support block to said housing, said linear slide having a first member fixed to said housing and a second member fixed to said support block, said second member being linearly movable relative to said first member.

16. The trimming assembly of claim 15 wherein said first biasing assembly is coupled to said housing, and operably engages said support block and said housing, and urges said support block toward a linearly centered position, said second biasing assembly coupled to said housing and operably engaging said tool holder.

17. The trimming assembly of claim 16 wherein second biasing assembly further includes first and second dowels fixed to rotate with said tool holder, biasing elements operably engaging said first dowel to urge said tool holder toward the rotationally centered position, and adjustable stops operably engaging said second dowel to limit rotation of said tool holder about said rotational axis, wherein said first dowel is spaced from and aligned with said second dowel.

* * * * *